United States Patent
Honeycutt et al.

(10) Patent No.: US 8,203,077 B2
(45) Date of Patent: Jun. 19, 2012

(54) CORD ORGANIZER AND RELATED METHODS

(75) Inventors: Jason Honeycutt, Charlotte, NC (US);
Ian Kovacevich, Charlotte, NC (US);
Joseph William Simmons, New Bern, NC (US); Randall Wade Hatfield, New Bern, NC (US)

(73) Assignee: Edison Nation, LLC, Charlotte, NC (US)

( * ) Notice: Subject to any disclaimer, the term of this patent is extended or adjusted under 35 U.S.C. 154(b) by 328 days.

(21) Appl. No.: 12/541,129

(22) Filed: Aug. 13, 2009

(65) Prior Publication Data

US 2010/0038114 A1 Feb. 18, 2010

Related U.S. Application Data

(60) Provisional application No. 61/088,711, filed on Aug. 13, 2008.

(51) Int. Cl.
*H05K 5/03* (2006.01)

(52) U.S. Cl. ............... 174/66; 174/67; 174/135; 439/4; 439/501; 220/241; 220/242

(58) Field of Classification Search ................ 174/135, 174/66, 67, 53, 72 A, 68.1; 439/4, 501, 536, 439/373; 220/241, 242; 248/68.1, 74.1, 248/51, 49, 74.2, 62; 242/388; D8/356, D8/333, 349, 354, 367; D13/154, 153, 177, D13/156; 24/407; 385/134, 135; 206/702
See application file for complete search history.

(56) References Cited

U.S. PATENT DOCUMENTS

| | | | |
|---|---|---|---|
| 355,491 | A | 1/1887 | Wiley |
| 810,004 | A | 1/1906 | Tabler |
| 2,016,041 | A | 10/1935 | Koopetz |
| 2,084,953 | A | 6/1937 | Gibson |
| 2,167,541 | A | 7/1939 | Young |
| 2,231,001 | A | 2/1941 | Engstrom |
| 2,438,143 | A | 3/1948 | Brown |
| 2,746,112 | A | 5/1956 | Simon |

(Continued)

OTHER PUBLICATIONS

ICW-1 Cord Wrap—InterChange, Cord Rope and Chain Storage Wrap, All Bright Ideas—Where Organizing Is Made Easy, Last Modified Date: Mar. 13, 2004, Copyright All Bright Ideas Inc 1998, 1 pages, http://www.allbrightideas.com/ICW-1_cord_wrap.asp.

(Continued)

*Primary Examiner* — Angel R Estrada
(74) *Attorney, Agent, or Firm* — Tillman Wright, PLLC; James D. Wright; Chad D. Tillman

(57) ABSTRACT

A cord organizer includes a cover plate and a cord retaining member. The cover plate includes a central portion having a plurality of openings defined therethrough. The openings include a fastener opening, and a receptacle opening. The cover plate further includes a curved, end portion curved inwardly away from a back side of the cover plate, having a slit defined therethrough, and at least one male fastening member extending from the back side of the cover plate. The cord retaining member includes a female fastening opening, and a strap portion. The strap portion of the cord retaining member is capable of passing through the slit of the curved, end portion, and the cord organizer is configured to allow the strap portion to be secured after an end of the strap has passed through the slit of the curved, end portion.

16 Claims, 19 Drawing Sheets

U.S. PATENT DOCUMENTS

| | | | |
|---|---|---|---|
| 2,943,138 | A | 6/1960 | Reager |
| 2,956,324 | A | 10/1960 | Klein |
| 3,013,105 | A | 12/1961 | Craig |
| 3,042,739 | A | 7/1962 | Craig |
| 3,113,996 | A | 12/1963 | Sanford |
| 3,197,830 | A | 8/1965 | Hoadley |
| 3,257,497 | A | 6/1966 | Chase |
| 3,257,694 | A | 6/1966 | Litwin |
| 3,441,986 | A | 5/1969 | Pritchard |
| 3,486,531 | A | 12/1969 | Nalodka |
| 3,689,868 | A | 9/1972 | Snyder |
| 3,930,116 | A | 12/1975 | Richards |
| 4,067,526 | A | 1/1978 | Storer |
| 4,285,486 | A | 8/1981 | Von Osten et al. |
| 4,335,863 | A | 6/1982 | Rapps |
| 4,343,525 | A | 8/1982 | Knickerbocker |
| D275,175 | S | 8/1984 | Rolli, Jr. |
| 4,566,185 | A | 1/1986 | Bryan et al. |
| 4,566,666 | A * | 1/1986 | Meska et al. .................... 174/66 |
| 4,664,469 | A | 5/1987 | Sachs |
| 4,707,906 | A | 11/1987 | Posey |
| 4,826,114 | A | 5/1989 | Umehara |
| D304,676 | S | 11/1989 | Glynn |
| 4,921,444 | A | 5/1990 | Cama |
| 5,044,976 | A * | 9/1991 | Thompson .................... 439/373 |
| 5,071,367 | A | 12/1991 | Luu |
| D323,285 | S | 1/1992 | Thomson |
| 5,104,335 | A | 4/1992 | Conley et al. |
| 5,159,728 | A | 11/1992 | Bingold |
| 5,181,684 | A | 1/1993 | Sager |
| 5,184,792 | A | 2/1993 | Bernhard et al. |
| D368,649 | S | 4/1996 | Smartnick |
| 5,547,390 | A | 8/1996 | Laherty |
| 5,591,043 | A | 1/1997 | Kenney |
| 5,639,049 | A | 6/1997 | Jennings et al. |
| D409,522 | S | 5/1999 | Satterfield et al. |
| 6,095,846 | A * | 8/2000 | Becerra ......................... 439/373 |
| D444,685 | S | 7/2001 | Shenkel et al. |
| 6,313,406 | B1 | 11/2001 | Gretz |
| 6,349,452 | B1 * | 2/2002 | Cisneros ....................... 174/135 |
| 6,349,904 | B1 * | 2/2002 | Polad ........................... 248/74.3 |
| 6,355,887 | B1 | 3/2002 | Gretz |
| 6,398,596 | B1 | 6/2002 | Malin |
| 6,425,165 | B2 | 7/2002 | Koppang |
| 6,503,097 | B2 | 1/2003 | Archambault |
| 6,634,063 | B2 | 10/2003 | Joseph |
| 6,646,893 | B1 * | 11/2003 | Hardt et al. ..................... 439/95 |
| D488,374 | S | 4/2004 | Hussaini et al. |
| D491,046 | S | 6/2004 | Johnson |
| 6,793,523 | B1 | 9/2004 | Wei |
| 7,230,181 | B2 | 6/2007 | Simmons et al. |
| 7,255,588 | B2 | 8/2007 | Wilder |
| 7,318,568 | B2 | 1/2008 | Barouta |
| D565,401 | S | 4/2008 | Grady et al. |
| 7,470,141 | B2 | 12/2008 | Yoest |
| 7,478,783 | B2 | 1/2009 | Royer |
| 7,528,323 | B2 * | 5/2009 | Wu et al. ......................... 174/66 |
| D599,196 | S | 9/2009 | Ruffin et al. |
| 2002/0061678 | A1 | 5/2002 | Archambault |
| 2004/0077212 | A1 | 4/2004 | Pulizzi |
| 2004/0108126 | A1 | 6/2004 | Kaloustian |
| 2005/0161249 | A1 | 7/2005 | McBain |

OTHER PUBLICATIONS

Information Disclosure Statement (IDS) Letter Regarding Common Patent Application(s), Dated Feb. 18, 2010.

* cited by examiner

120

120

120

220

140

140

CORD ORGANIZER AND RELATED METHODS

CROSS-REFERENCE TO RELATED APPLICATION

The present application is a U.S. nonprovisional patent application of, and claims priority under 35 U.S.C. §119(e) to, U.S. provisional patent application Ser. No. 61/088,711, filed Aug. 13, 2008, which provisional patent application is incorporated by reference herein.

Further, the present application hereby incorporates the following patent, patent applications, and patent application publication by reference:
(1) provisional U.S. patent application Ser. No. 60/562,708, filed Apr. 16, 2004;
(2) U.S. Pat. No. 7,230,181, issued Jun. 12, 2007; and
(3) U.S. patent application Ser. No. 11/761,343, filed Jun. 11, 2007, which published as U.S. patent application publication no. 2007/0228225.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to a cord organizer for use in organizing electrical cords.

Electrical and electronic devices and machines are increasingly commonplace in today's home and workplace. An unfortunate side effect of this proliferation is an ever increasing likelihood of having to deal with tangled and unsightly electrical cords. Numerous apparatus and methods have attempted to tackle this problem. Despite these attempts, however, a need still exists for improvement in the field of cord organization. This, and other needs, are addressed by one or more aspects of the present invention.

SUMMARY OF THE INVENTION

The present invention includes many aspects and features. Moreover, while many aspects and features relate to, and are described in, the context of organizing electrical cords, the present invention is not limited to use only in organizing electrical cords, as will become apparent from the following summaries and detailed descriptions of aspects, features, and one or more embodiments of the present invention.

Accordingly, one aspect of the present invention relates to a generally flat cord organizer, defining a strip, having opposite first and second surfaces, a cutout defined therein, said first surface having a plurality of hook fastening components, and said second surface having a plurality of loop fastening components.

Another aspect of the present invention relates to a cord organizer. The cord organizer includes a segment having a cutout defined therein and a strip extending from the segment. The strip has a first surface having a plurality of hook fastening components and a second surface having a plurality of loop fastening components. The cord organizer is generally flat.

In a feature of this aspect of the invention, the segment also has a first surface, having a plurality of hook fastening components, and a second surface, having a plurality of loop fastening components.

In a feature of this aspect of the invention, said cutout is shaped and dimensioned to correspond to an electrical receptacle.

In a feature of this aspect of the invention, said segment and said strip are integrally formed.

In a feature of this aspect of the invention, said segment is generally rectangular.

In a feature of this aspect of the invention, the cord organizer further comprises a slit defined in said segment.

In a feature of this aspect of the invention, the cord organizer further comprises a second cutout.

In a feature of this aspect of the invention, the cord organizer further comprises a second strip extending from the segment.

In a feature of this aspect of the invention, said cutouts are disposed relative to one another so as to be able to receive electrical receptacles disposed in a standard configuration of a duplex electrical outlet.

In a feature of this aspect of the invention, the cord organizer further comprises a hole that is sized, dimensioned, and positioned such that a standard cover plate screw can pass therethrough when electrical receptacles of a duplex electrical outlet are received within said cutouts.

Another aspect of the present invention relates to a method of installing a cord organizer at an electrical outlet. The method includes removing a cover plate of the electrical outlet, positioning the cord organizer over said electrical outlet such that electrical receptacles of said electrical outlet are received within one or more cutouts defined in said cord organizer, and replacing and re-securing said cover plate, via a cover plate screw that passes through a screw hole of said cord organizer, such that said cord organizer is thereby secured.

In a feature of this aspect of the invention, said cord organizer has opposite first and second surfaces, said first surface has a plurality of hook fastening components, and said second surface has a plurality of loop fastening components, and said cord organizer includes a strip.

Another aspect of the present invention relates to a method of retaining an electrical cord. The method includes positioning a cord within a retaining cuff defined by threading a strip of a cord organizer installed at an electrical outlet through a slit of the cord organizer, tightening said retaining cuff around said cord by increasing the lengthwise extent of the strip that has been threaded through the slit, and securing said strip to itself or to said cord organizer utilizing hook and loop fastener components.

In a feature of this aspect of the invention, said cord organizer has opposite first and second surfaces, said first surface has a plurality of hook fastening components, and said second surface has a plurality of loop fastening components.

Another aspect of the present invention relates to a cord organizer. The cord organizer includes a cover plate, including a central portion having a plurality of openings defined therethrough, the openings including at least one fastener opening, and at least one receptacle opening, and a curved, end portion curved inwardly away from a back side of the cover plate, the curved, end portion including a slit defined therethrough, and at least one male fastening member extending from the back side of the cover plate; and a cord retaining member, including at least one female fastening opening, and a strap portion; wherein the strap portion of the cord retaining member is capable of passing through the slit of the curved, end portion of the cover plate; and wherein the cord organizer is configured to allow the strap portion of the cord retaining member to be secured after an end of the strap has passed through the slit of the curved, end portion of the cover plate.

In a feature of this aspect of the invention, the cord organizer is configured to allow the strap portion of the cord retaining member to be secured to the cord retaining member after an end of the strap has passed through the slit of the curved, end portion of the cover plate.

In a feature of this aspect of the invention, the cord retaining member includes a barb extending therefrom, and further includes a plurality of barb receiving openings defined through its strap portion, the barb receiving openings and the barb being sized and dimensioned such that the barb is able to pass through the barb receiving openings.

In a feature of this aspect of the invention, the barb is integrally formed with the cord retaining member.

In a feature of this aspect of the invention, the barb is a separate component retained within the cord retaining member.

In a feature of this aspect of the invention, the barb includes a receiving channel which receives and grips a portion of the cord retaining member defining a barb holding aperture of the cord retaining member, whereby the barb is retained within the barb holding aperture of the cord retaining member.

In a feature of this aspect of the invention, the barb includes two bulbs, and two valleys, each valley corresponding to one of the bulbs.

In a feature of this aspect of the invention, each valley is configured to receive and retain the strap portion via one of the plurality of barb receiving openings.

In a feature of this aspect of the invention, a perimeter of a first barb receiving opening of the plurality of barb receiving openings is disposed about a first valley of the two valleys of the barb.

In a feature of this aspect of the invention, a perimeter of a second barb receiving opening of the plurality of barb receiving openings is disposed about a second valley of the two valleys of the barb.

In a feature of this aspect of the invention, the at least one receptacle opening comprises two socket openings, each socket opening being sized and dimensioned to provide access to an electrical socket, and wherein the at least one fastener opening comprises a screw opening configured for receipt of a screw.

In a feature of this aspect of the invention, a tip of the at least one male fastening member is not the rearmost point of the back side of the cord organizer.

In a feature of this aspect of the invention, a surface of the back side of the cover plate is configured to abut a wall, and wherein the at least one male fastening member does not extend beyond a plane defined by that surface.

In a feature of this aspect of the invention, the cover plate is secured to an electrical receptacle.

In a feature of this aspect of the invention, an electrical cord is plugged into an electrical socket of the electrical receptacle, and wherein excess length of the electrical cord is retained by the cord organizer.

Another aspect of the present invention relates to a method of organizing an electrical cord. The method includes fastening, to a cover plate having a curved, end portion, a cord retaining member; securing, in covering relation to an electrical receptacle, the cover plate such that an electrical socket of the electrical receptacle is accessible via a receptacle opening of the cover plate; inserting an electrical plug into the electrical socket of the electrical receptacle; gathering an electrical cord extending from the electrical plug; passing an end of a strap portion of the cord retaining member through a slit defined in the cover plate such that a retaining loop is defined; disposing a portion of the electrical cord within the retaining loop; causing a larger extent of the strap portion to pass through the slit such that a circumference of the retaining loop decreases and the retaining loop tightens around the portion of the electrical cord; securing the strap portion such that the electrical cord is retained within the retaining loop.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
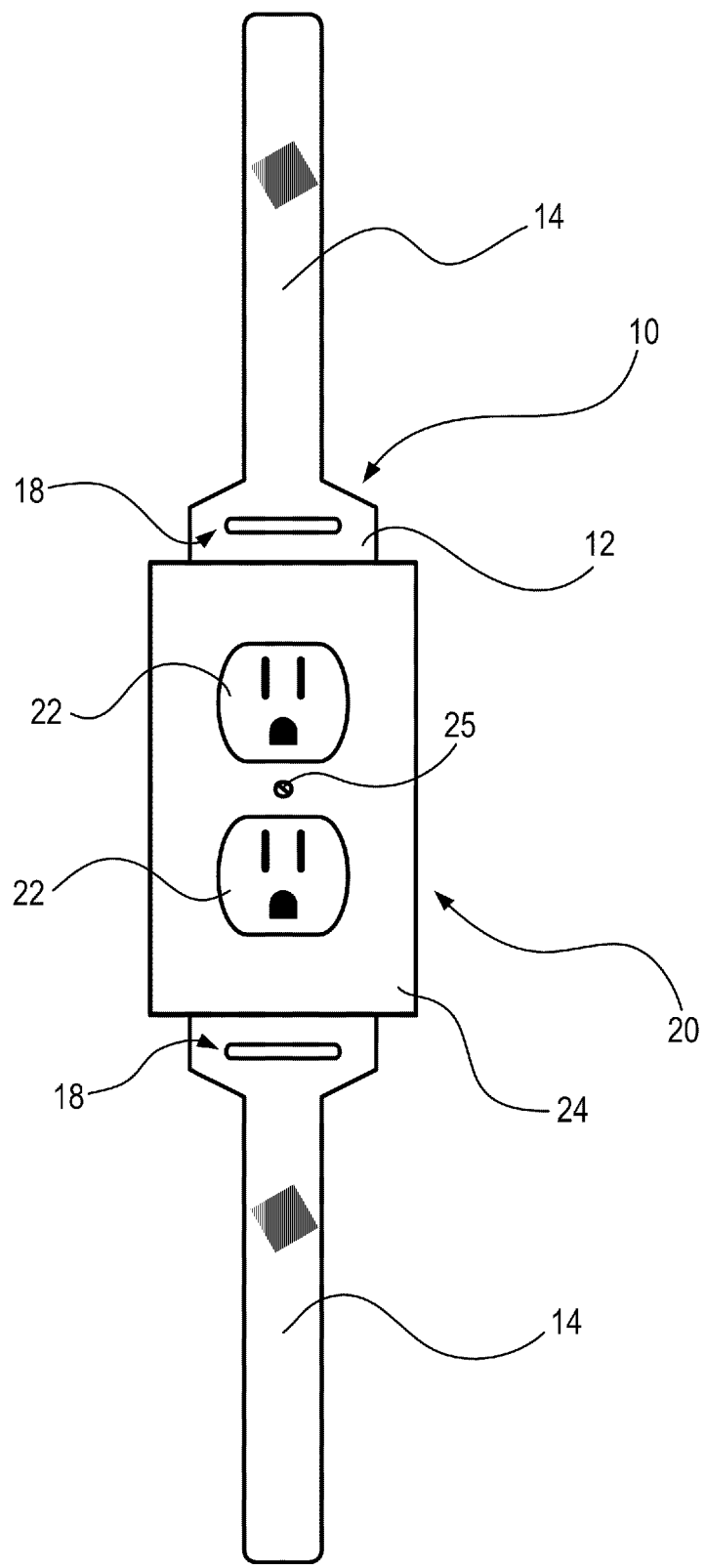
FIG. 1 is a plan view of a cord organizer installed in a standard duplex electrical outlet in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the figures, FIG. 1 is a plan view of a cord organizer 10 installed in a standard duplex electrical outlet 20 in accordance with one or more preferred embodiments of the present invention. As further described below, the cord organizer 10 is installed behind the cover plate 24 such that a respective strip 14 extends above and below the outlet 20 for wrapping cords.

Figure 2A:
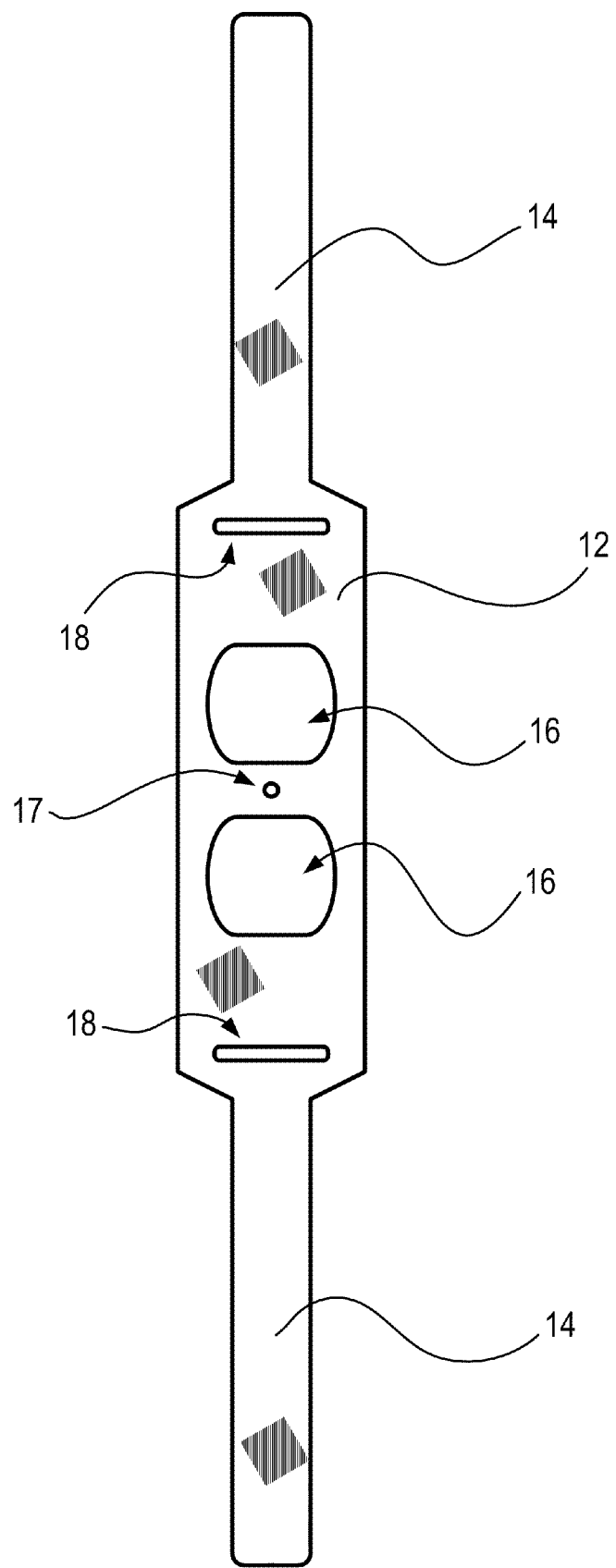
FIGS. 2A and 2B are front and rear plan views, respectively, of a cord organizer in accordance with a preferred embodiment of the present invention.
Figure 2B:
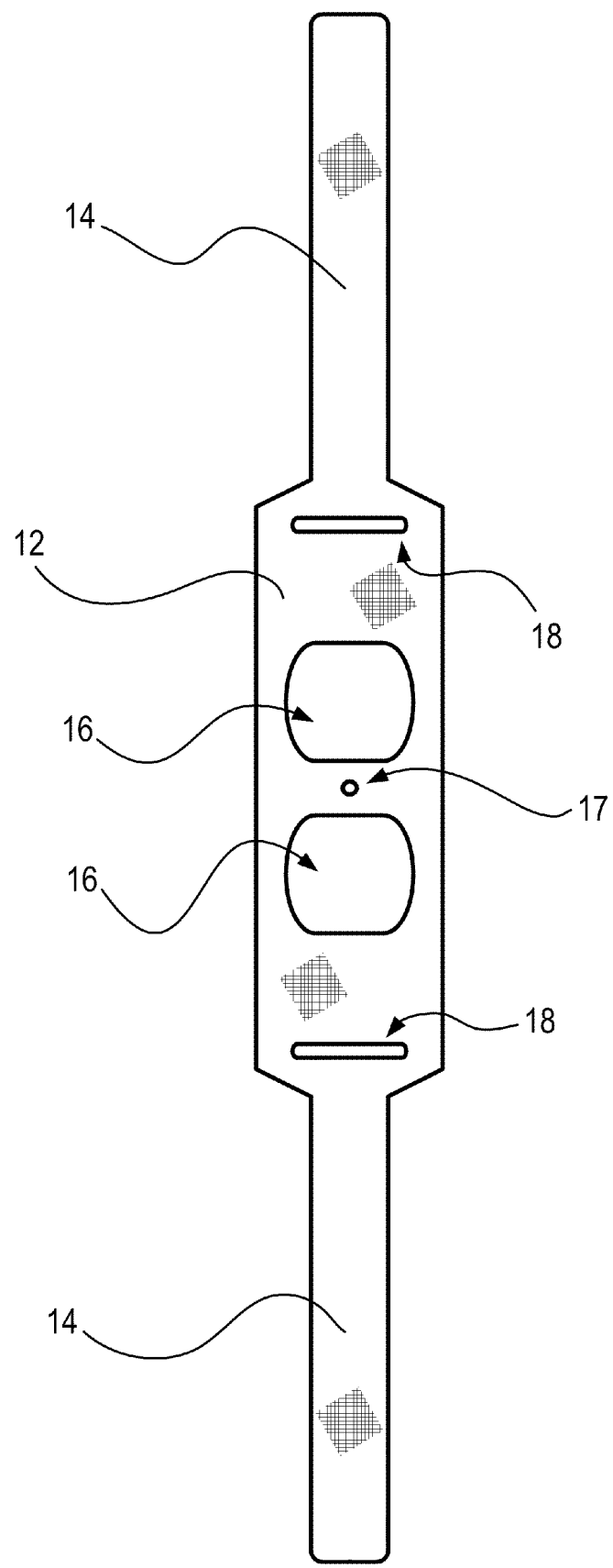

FIGS. 2A and 2B are front and rear plan views, respectively, of a cord organizer 10 in accordance with a preferred embodiment of the present invention. The cord organizer 10 is comprised of a flat, pliable material and has two opposing sides or surfaces: a front hook side or surface, as can be seen in FIG. 2A, and a rear loop side or surface, as can be seen in FIG. 2B. The front hook surface includes, or is covered by, a plurality of tiny plastic, injection molded hook fastening components. The rear loop surface includes, or is covered by, a plurality of tiny woven loop fastening components. Together, the hook fastening components and loop fastening components comprise a hook and loop fastener. Hook and loop fasteners, such as those sold by Velcro Industries B.V. under the trademark VELCRO®, are well known.

The cord organizer 10 of FIGS. 2A and 2B includes a relatively large, generally rectangular segment 12 having a strip 14 extending from each lengthwise side thereof. Preferably, the rectangular segment 12 tapers at each lengthwise side to the height of each respective strip 14, as can be seen in FIGS. 1A and 1B.

Figure 3:
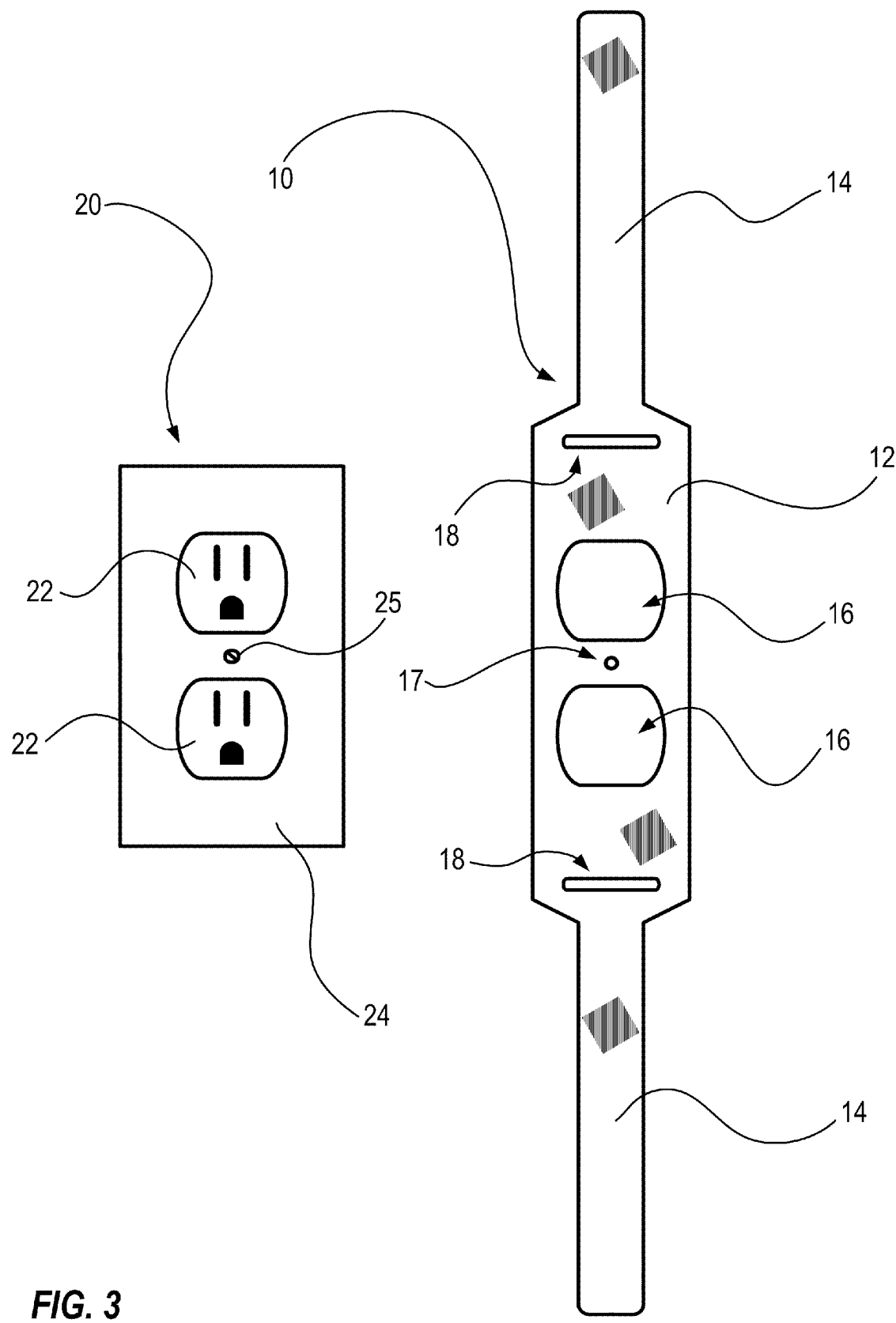
FIG. 3 is a plan view of the cord organizer of FIG. 1, illustrated removed from, and adjacent to, the electrical outlet.

FIG. 3 is a plan view of the cord organizer 10 of FIG. 1, illustrated removed from, and adjacent to, the electrical outlet 20. The rectangular segment 12 includes two cutouts 16 and two slits 18 defined therein. Preferably, the rectangular segment 12 further includes a screw hole 17 defined therein. The cutouts 16 are shaped and dimensioned to correspond at least approximately to the electrical receptacles 22 of the electrical outlet 20, as can be seen in FIG. 3.

The illustrated cord organizer 10 may be installed at any standard duplex electrical outlet 20. First, a cover plate 24 of the electrical outlet 20 is removed. Next, the cord organizer 10 is positioned over the electrical outlet 20, with either surface facing outward, such that each electrical receptacle 22 is received within one of the cutouts 16. The cover plate 24 is then replaced. It is noteworthy that the screw hole 17 is positioned such that a screw 25 securing the cover plate 24 will pass therethrough. It will be appreciated that the cord organizer 10 will be retained in position by the cover plate 24, as can be seen in FIG. 1.

Figure 4:
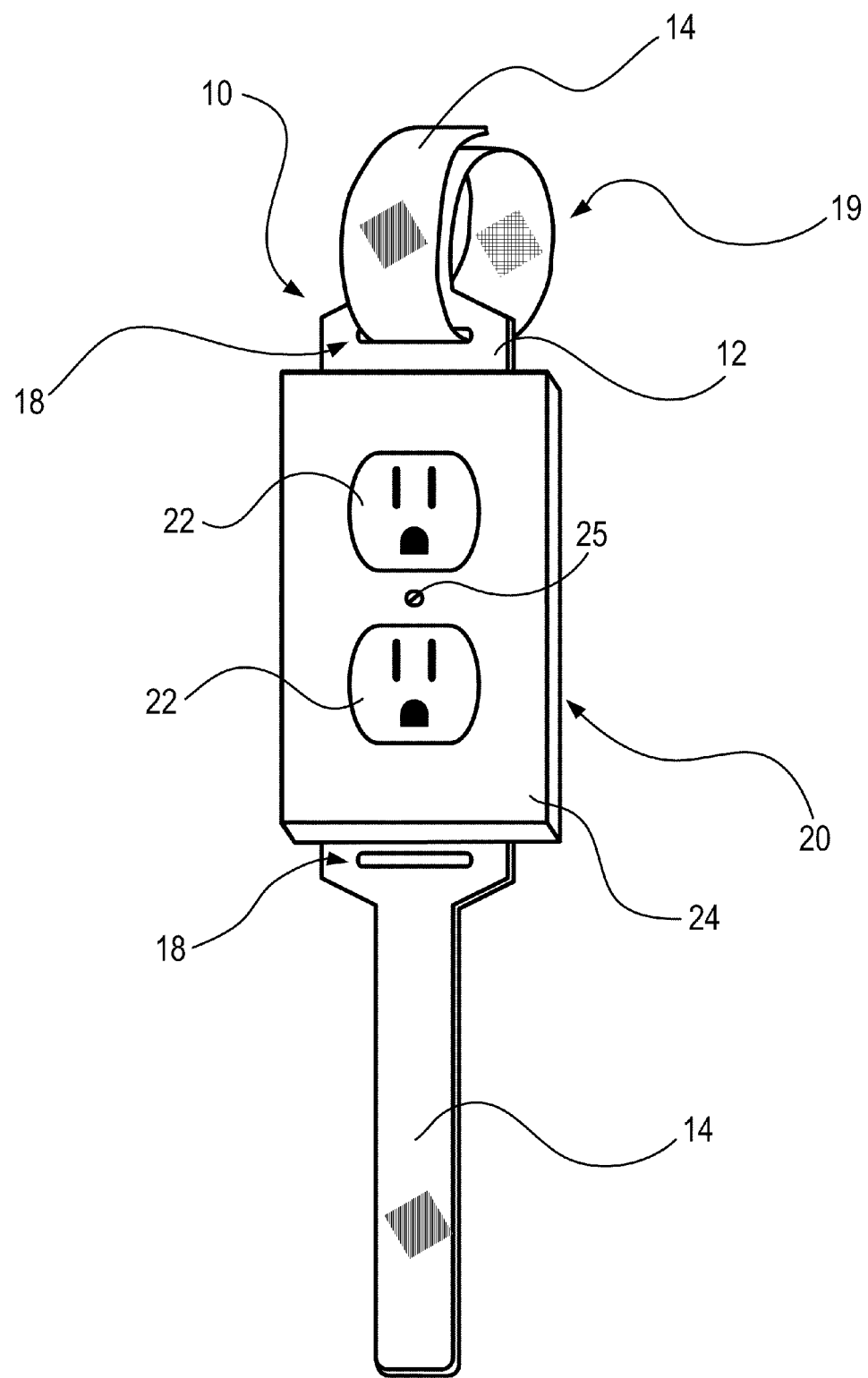
FIGS. 4 and 5 are perspective views of the cord organizer and outlet of FIG. 1.
Figure 5:
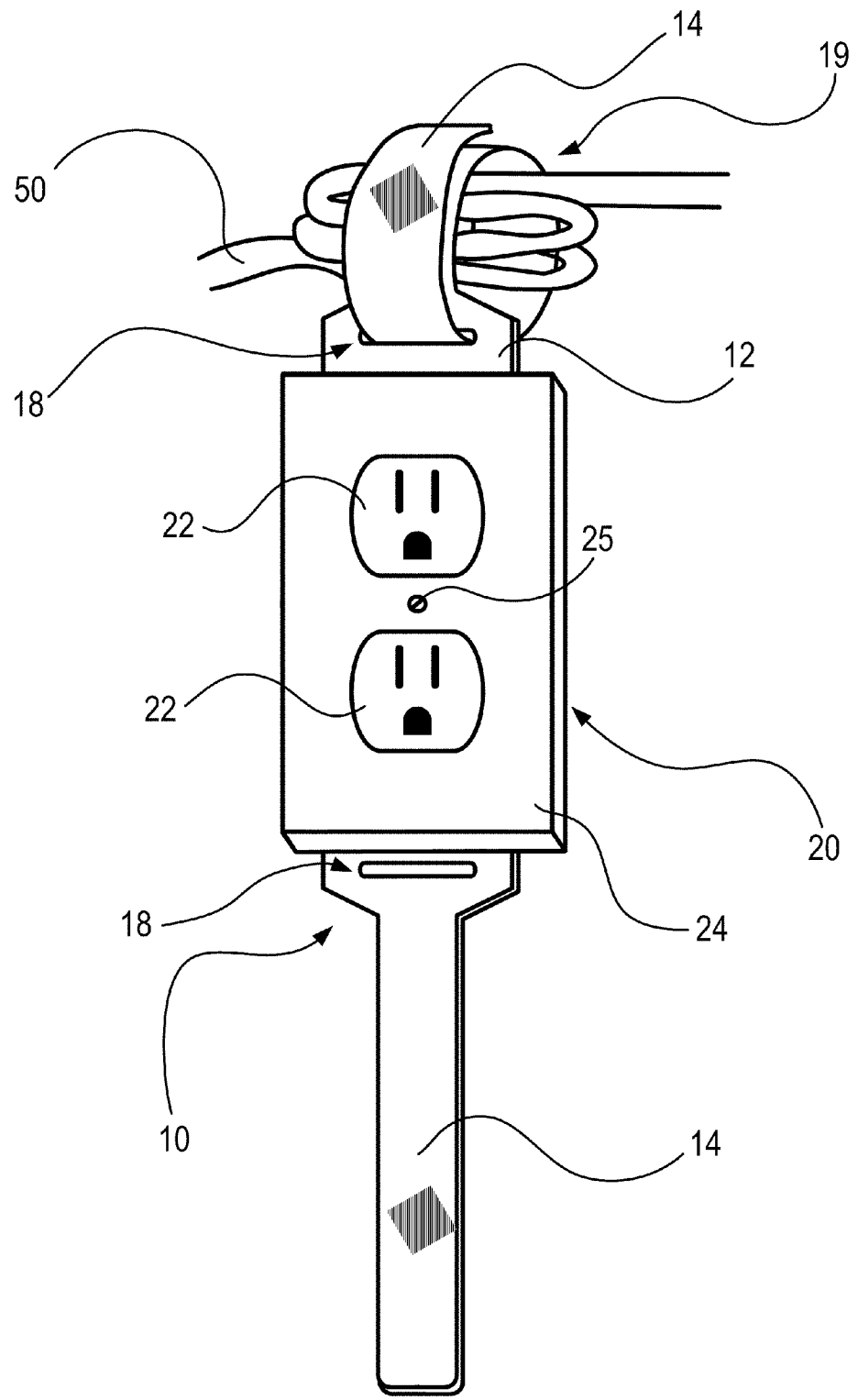

FIGS. 4 and 5 are perspective views of the cord organizer 10 and outlet 20 of FIG. 1. Once installed, a user may utilize the strips 14 to retain one or more cords. It will be appreciated that any portion of either surface of the cord organizer 10 can be secured to any portion of the opposite surface of the cord organizer 10 by means of the hook and loop fastening components described hereinabove. Thus, a wound cord bundle 50 can be retained by wrapping one of the strips 14 tightly around the bundle 50 and then securing the strip 14 to itself utilizing the hook and loop fastening components. Preferably, the strip 14 is threaded through the slit 18 that is proximate the strip 14, thereby defining a retaining cuff 19, as can be seen in FIG. 4. It will be appreciated that by increasing or decreasing the lengthwise extent of the strip 14 that is threaded through the slit 18, the circumference of the retaining cuff 19 is respectively decreased or increased. In this way, a wound cord 50 can be disposed within the retaining cuff 19, and the retaining cuff 19 can then be tightened to retain the wound cord 50, as can be seen in FIG. 5.

It will be further appreciated that the strip 14 on the opposite side of the organizer 10 may alternatively be utilized, or that both strips 14 may be used at once, particularly when numerous cords are present. Furthermore, in at least one alternative embodiment, only one strip 14 is provided. Still further, it will be appreciated that one or both strips 14 may be applied to cords that are not bundled. For example, a single loop of a cord may be created and held in place using one or both of the strips 14.

It will still further be appreciated that the entire front and rear surfaces of the cord organizer 10 need not be covered by corresponding hook and loop fasteners so long as the strips 14 are so covered. Furthermore, in at least one alternative embodiment, one or both of the strips 14 are replaced by cable ties (also known as zip ties).

As described hereinabove, the cord organizer 10 is configured such that it may be installed behind a cover plate 24 covering an electrical outlet 20. In alternative preferred embodiments, however, a cord organizer itself comprises a cover plate.

Figure 6:
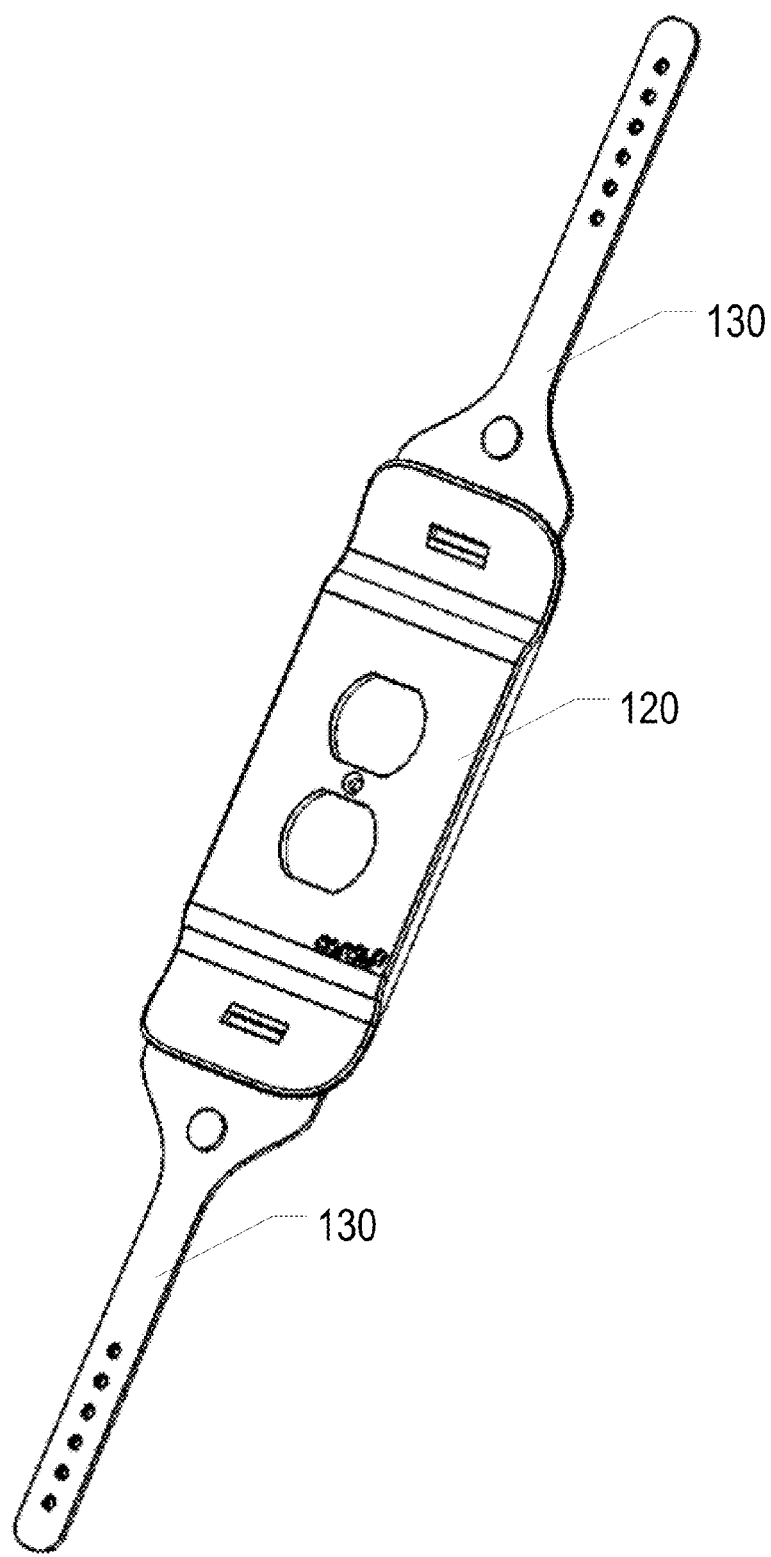
FIG. 6 is a perspective view of another cord organizer in accordance with one or more preferred embodiments of the present invention.

FIG. 6 illustrates such a cord organizer 110 that includes a cover plate 120. As illustrated in FIG. 6, in addition to a cover plate 120, the cord organizer further comprises two cord retaining members 130, which are configured to be removably secured to the cover plate 120.

Figure 7A:
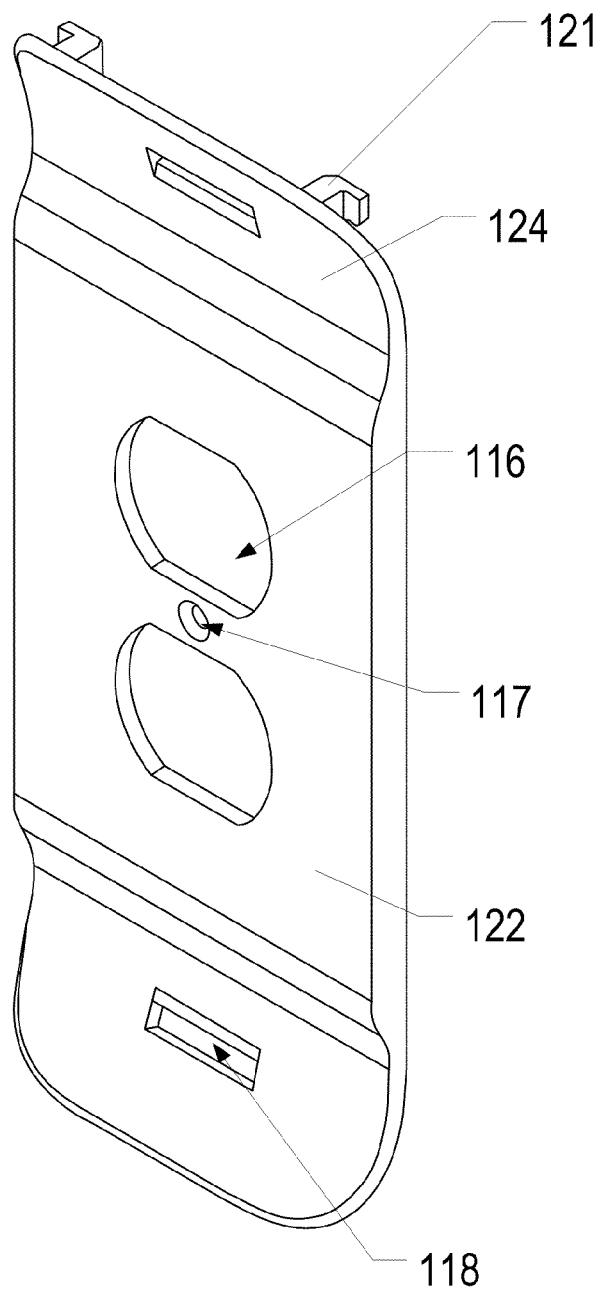
FIGS. 7A-C illustrate a cover plate of the cord organizer of FIG. 6.
Figure 7B:
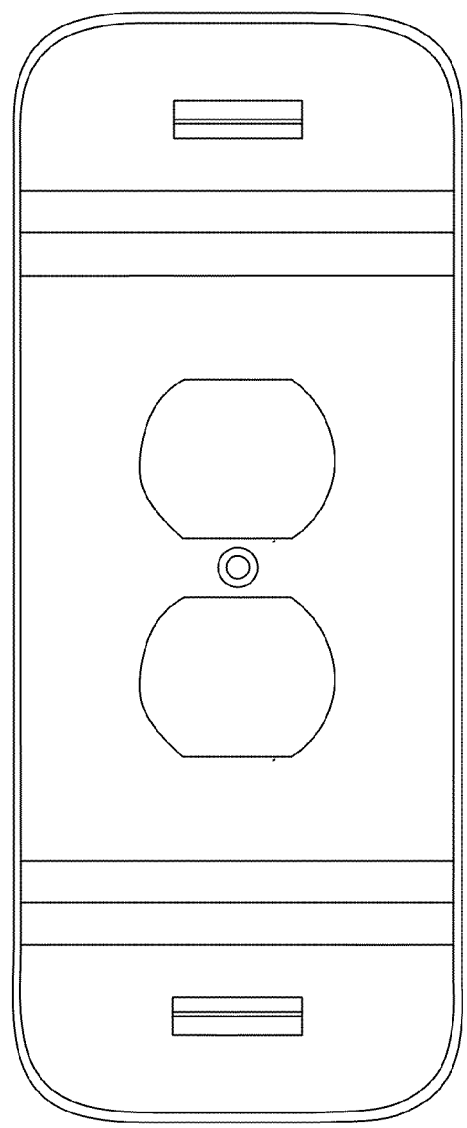
Figure 7C:
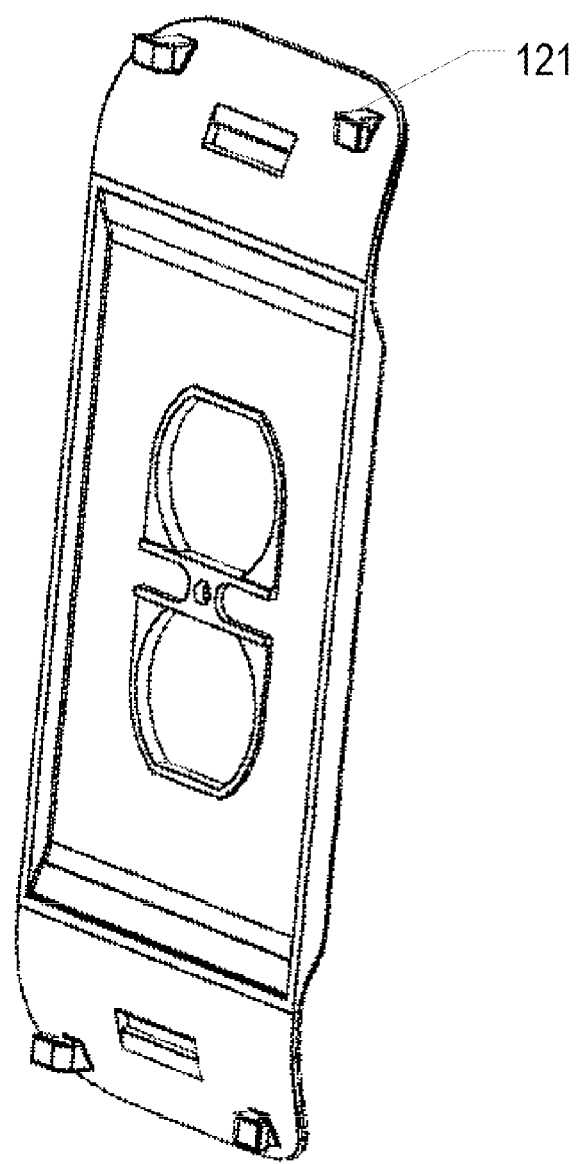

FIGS. 7A and 7B represent a perspective view, and a front view, respectively, of the cover plate 120. The cover plate 120 can be characterized as including a central portion 122, and top and bottom curved portions 124. It will be appreciated that although illustrated as including both top and bottom curved portions 124, in at least some alternative embodiments a cord organizer may include only a single curved portion.

The central portion 122 includes two outlet openings 116, as well as a screw opening 117, defined therethrough. The screw opening 117 is sized and dimensioned for insertion of a screw, which may be used to retain the cover plate 120 to a standard electrical receptacle set in a wall. Accordingly, the outlet openings 116 are sized and dimensioned to provide access to electrical outlets of an electrical receptacle the cover plate 120 is covering.

Figure 8A:
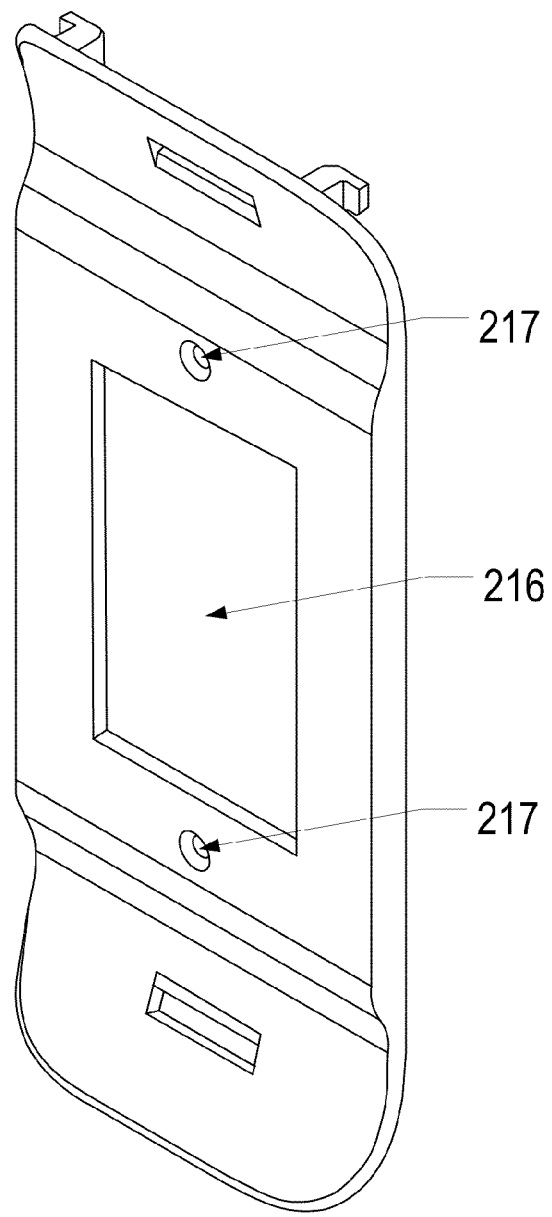
FIGS. 8A-B illustrate a cover plate of a cord organizer in accordance with one or more preferred embodiments of the present invention.
Figure 8B:
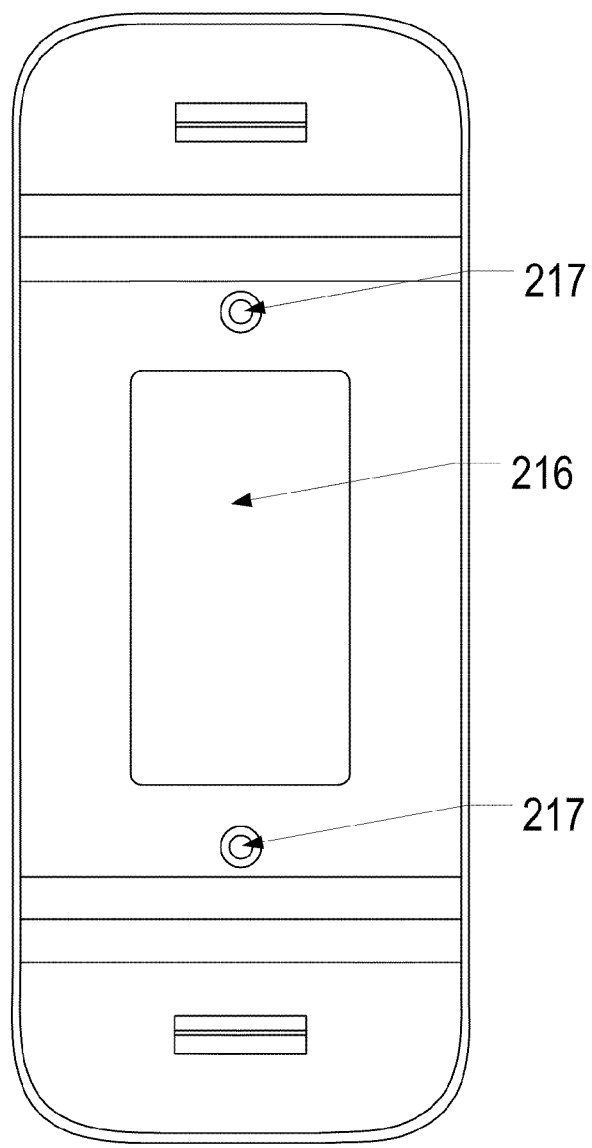

It will be appreciated that not all electrical receptacles are configured identically. In alternative implementations, cover plates may be utilized which are configured for use with differently configured electrical receptacles. FIGS. 8A-B illustrate such an alternative cover plate 220, which includes a single receptacle opening 216 and two screw openings 217.

Returning to the cover plate 120, each curved portion 124, as its name implies, is curved frontward, away from a back side of the cover plate 120, as can be seen in FIG. 7A. Further, the sides of each curved portion 124 taper inwardly proximate the respective top or bottom edge of the cover plate 120, such that the cover plate 120 exhibits rounded corners, as perhaps best illustrated in FIG. 7B.

As noted hereinabove, the cover plate 120 is configured to allow two cord retaining members 130 to be removably secured thereto. More specifically, the cover plate 120 includes two male attachment members 121 protruding from a back side thereof, although it will be appreciated that more or less male attachment members 121 may be utilized in alternative implementations. Preferably, each male attachment member 121 comprises a hook. Further, in preferred implementations, the cover plate 120 is configured such that when the cover plate 120 is attached to an electrical receptacle and the male attachment member 121 protrudes towards a wall the electrical receptacle is set in, the male attachment member 121 does not extend into the wall. In at least some preferred implementations, the male attachment member 121 does not protrude beyond the furthest point of the back side of the central portion 122.

Figure 9:
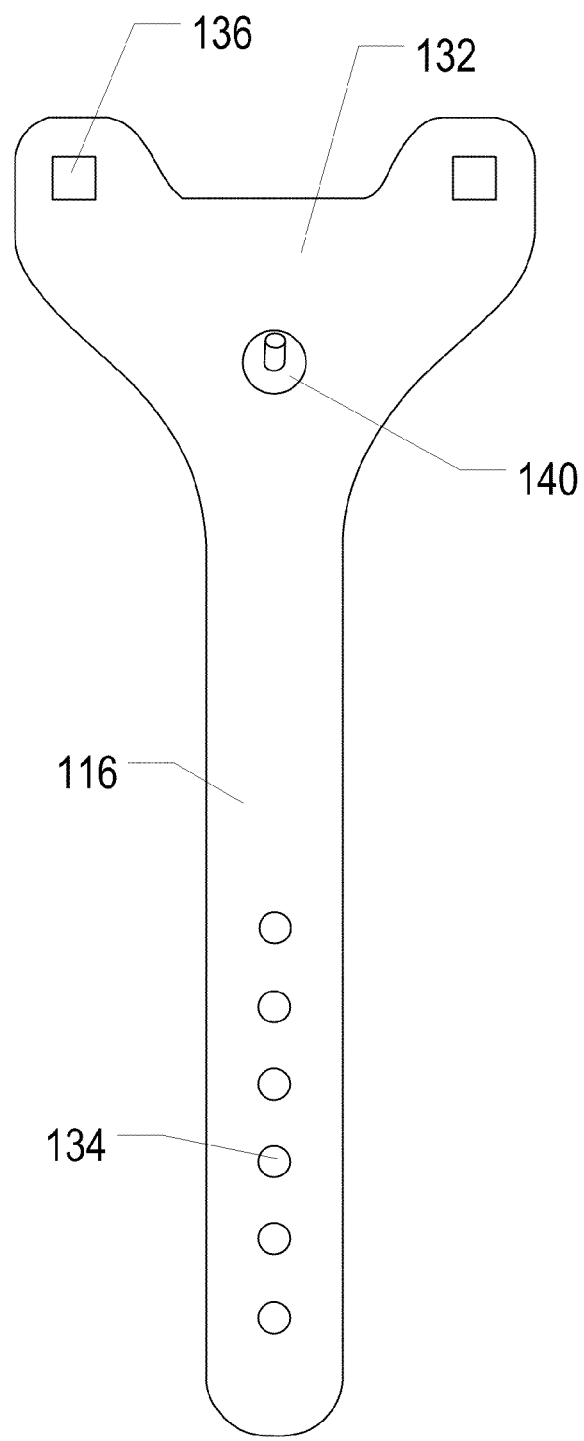
FIG. 9 illustrates a cord retaining member of the cord organizer of FIG. 6.

The male attachment members 121 are configured to mate with corresponding female attachment openings 136 of either of the cord retaining members 130 in order to removably secure that cord retaining member 130 to the cover plate 120. FIG. 9 illustrates such a cord retaining member 130. The cord retaining member 130 can be characterized as including a base portion 132 and a strap 114 extending therefrom. Although the base portion 132 is illustrated as being generally triangular, it will be appreciated that a base portion of any shape or size may be utilized. Preferably, however, the base portion is wider than the strap.

Each cord retaining member 130 preferably comprises an elastomeric material. In a preferred implementation, each cord retaining member 130 is integrally formed from an elastomeric material, although in preferred implementations a barb 140 may comprise a separate component as described hereinbelow.

In use, the cover plate 120 is secured to an electrical receptacle, or a wall in which an electrical receptacle is set, with a screw, such that electrical outlets of the electrical receptacle are accessible via the outlet openings 116 of the cover plate 120. Either prior to, or subsequent to, such securement of the cover plate 120, one or more cord retaining members 130 are secured to the cover plate 120 via mating of male attachment members 121 of the cover plate 120 with female attachment openings 136 of the cord retaining members 130.

Once secured to the cover plate 120, a cord retaining member 130 can be utilized to retain an electrical cord. In a preferred method of use, when an electrical cord is plugged into one of the electrical outlets of the electrical receptacle, excess length of the electrical cord is wound up, and retained via use of the cord retaining member 130.

Specifically, an end of the strap 114 of the cord retaining member 130 is inserted through the slit 118 of the cover plate 120 such that a retaining loop is defined. In a preferred implementation, the strap 114 includes a bumper 115 disposed on its back side that is configured such that it will not easily pass through the slit 118 without application of force by a user.

Figure 10:
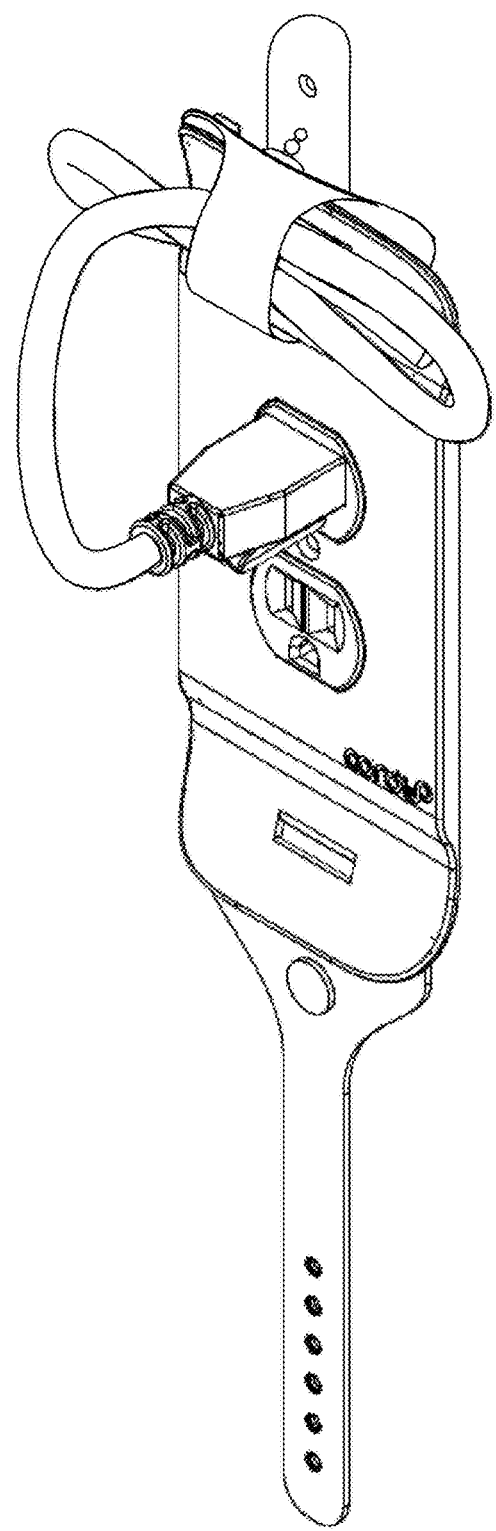
FIG. 10 illustrates the cord organizer of FIG. 6 in use.

After a retaining loop is defined, excess electrical cord, preferably wound up, is located inside the retaining loop, as illustrated in FIG. 10, and the retaining loop is then tightened by pulling the strap 114 further through the slit 118, thus decreasing the inner circumference of the retaining loop. When the retaining loop has been tightened to a desired circumference, preferably when it tightly surrounds the excess electrical cord, the strap 114 is then secured. Preferably, the strap 114 is secured to itself via mating of a barb 140 with a barb receiving opening 134 of a plurality of barb receiving openings 134 of the strap 114.

In a preferred implementation, the barb 140 is a separate component from the cord retaining member 130, although in at least some alternative implementations, the barb 140 is integrally formed with the cord retaining member 130.

Figure 11A:
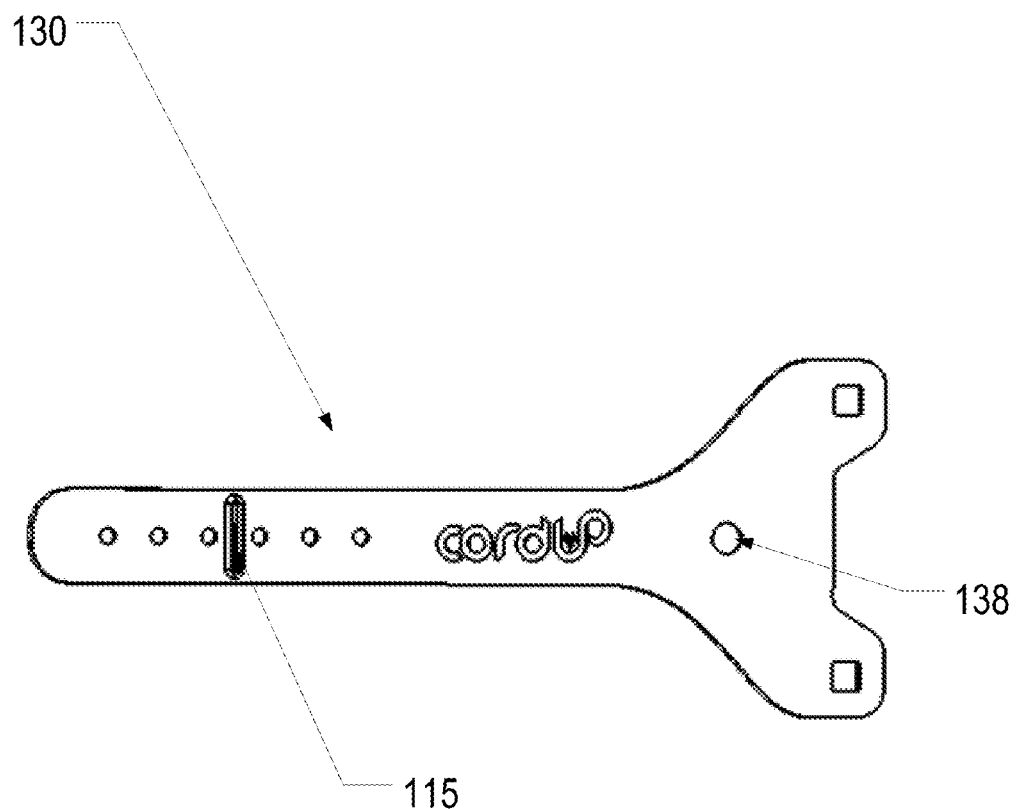
FIGS. 11A-B illustrate a cord retaining member without a barb disposed therein.
Figure 11B:
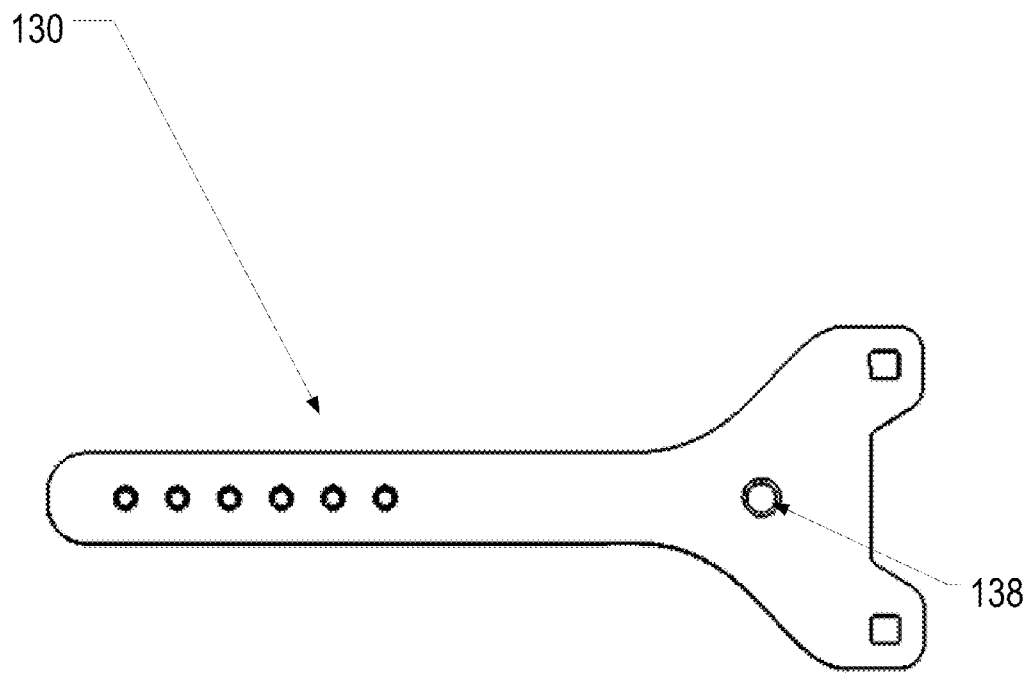
Figure 12A:
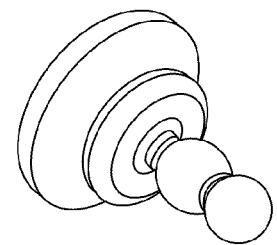
FIGS. 12A-B illustrate a barb of the cord organizer of FIG. 6.
Figure 12B:
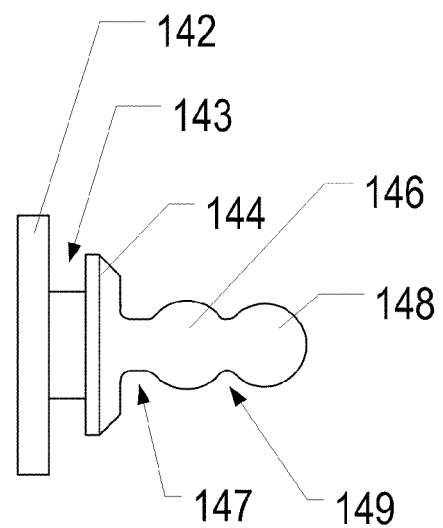
Figure 13A:
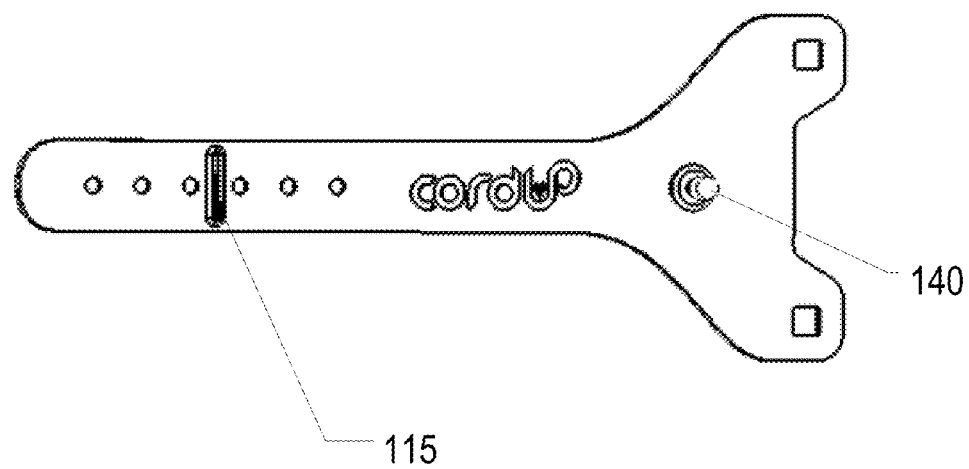
FIGS. 13A-B illustrate the cord retaining member of FIGS. 11A-B with the barb of FIGS. 12A-B retained therein.
Figure 13B:
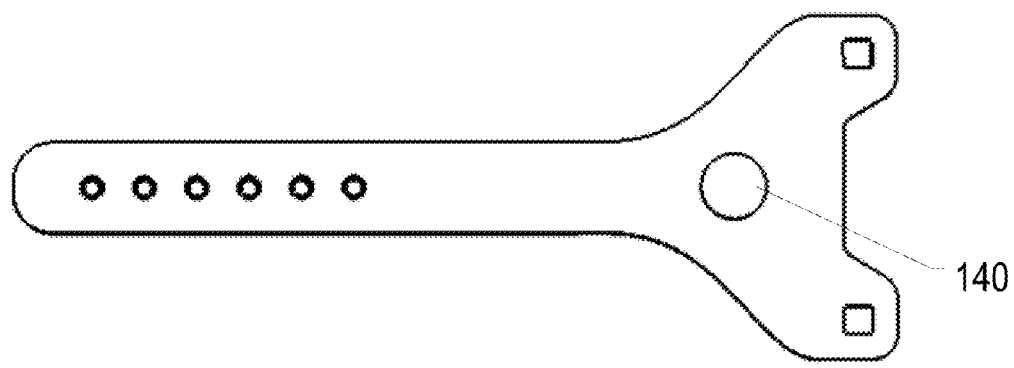

FIGS. 11A and 11B represent, respectively, front and back views of a cord retaining member 130 having a barb holding aperture 138 configured to receive and retain a barb 140. FIGS. 12A and 12B represent, respectively, perspective and side views of such a barb 140. The barb 140 includes a rear wall 142 and a front wall 144 which together define a receiving channel 143 therebetween. The cord retaining member 130 is configured such that, when the barb 140 is inserted into the barb holding aperture 138, portions of the cord retaining member 130 that define the perimeter of the barb holding aperture 138 will be received in the receiving channel 143, thereby retaining the barb 140 in the barb holding aperture 138.

The barb 140 further includes an inner bulb 146 and an outer bulb 148. Each bulb corresponds to an associated valley located inside of that bulb, i.e. the inner bulb 146 defines an inner valley 147 and the outer bulb 148 defines an outer valley 149.

Each bulb 146,148 is sized and dimensioned to correspond to the barb receiving openings 134 such that each bulb 146, 148 may pass through each barb receiving opening 134 when force is applied by a user. In this way, the outer bulb 148, or the inner and outer bulbs 146,148, may be passed through a barb receiving opening 134 until a periphery of that barb receiving opening 134 is disposed about one of the valleys 147,149.

Preferably, the bulbs 146,148 and barb receiving openings 134 are sized and dimensioned such that, once a periphery of a barb receiving opening 134 is disposed about one of the valleys 147,149, the periphery will not dislodge itself from the valley 147,149 it is disposed in absent external force, although it will be appreciated that, in at least some implementations, over time stresses may cause a cord retaining member 130 to dislodge itself.

Returning to the preferred method of use in which excess length of an electrical cord is wound up, and retained via use of the cord retaining member 130, as described hereinabove, the strap 114 is secured to itself via mating of a barb 140 with a barb receiving opening 134 of a plurality of barb receiving openings 134 of the strap 114.

Preferably, a periphery of one of the barb receiving openings 134 is disposed about the inner valley 147. It will be appreciated that, following such securement, additional length of the strap 114 may remain unsecured. Preferably, this additional length is then secured by disposing a periphery of another of the barb receiving openings 134 about the outer valley 149.

The above described cord organizers are configured for use with a standard duplex electrical outlet, as can be commonly found in U.S. homes and offices at this time. However, it will be appreciated that a cord organizer could be configured for other electrical outlets dimensioned or shaped differently, having a different number of receptacles, and/or having receptacles dimensioned or shaped differently.

For example, the cover plate of the cord organizer 110 may be modified in alternative implementations for use with differently configured electrical receptacles. FIGS. 8A-B illustrate such an alternative cover plate 220, which includes a single receptacle opening 216 and two screw openings 217.

Further, a cord organizer may be shaped differently than as described above. Moreover, the principles, elements, and methods described above in accordance with the present invention may readily and apparently be adapted to a variety of uses outside of the context of an electrical cord organizer.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A cord organizer, comprising:
    (a) a cover plate, including
        (i) a central portion having a plurality of openings defined therethrough, the openings including
            (A) at least one fastener opening, and
            (B) at least one receptacle opening, and
        (ii) a curved, end portion curved inwardly away from a back side of the cover plate, the curved, end portion including
            (A) a slit defined therethrough, and
            (B) at least one male fastening member extending from the back side of the cover plate; and
    (b) a cord retaining member, including
        (i) at least one female fastening opening, and
        (ii) a strap portion;
    (c) wherein the strap portion of the cord retaining member is capable of passing through the slit of the curved, end portion of the cover plate; and
    (d) wherein the cord organizer is configured to allow the strap portion of the cord retaining member to be secured after an end of the strap has passed through the slit of the curved, end portion of the cover plate.

2. The cord organizer of claim 1, wherein the cord organizer is configured to allow the strap portion of the cord retaining member to be secured to the cord retaining member after an end of the strap has passed through the slit of the curved, end portion of the cover plate.

3. The cord organizer of claim 2, wherein the cord retaining member includes a barb extending therefrom, and further includes a plurality of barb receiving openings defined through its strap portion, the barb receiving openings and the barb being sized and dimensioned such that the barb is able to pass through the barb receiving openings.

4. The cord organizer of claim 3, wherein the barb is integrally formed with the cord retaining member.

5. The cord organizer of claim 3, wherein the barb is a separate component retained within the cord retaining member.

6. The cord organizer of claim 5, wherein the barb includes a receiving channel which receives and grips a portion of the cord retaining member defining a barb holding aperture of the cord retaining member, whereby the barb is retained within the barb holding aperture of the cord retaining member.

7. The cord organizer of claim 3, wherein the barb includes two bulbs, and two valleys, each valley corresponding to one of the bulbs.

8. The cord organizer of claim 7, wherein each valley is configured to receive and retain the strap portion via one of the plurality of barb receiving openings.

9. The cord organizer of claim 8, wherein a perimeter of a first barb receiving opening of the plurality of barb receiving openings is disposed about a first valley of the two valleys of the barb.

10. The cord organizer of claim 9, wherein a perimeter of a second barb receiving opening of the plurality of barb receiving openings is disposed about a second valley of the two valleys of the barb.

11. The cord organizer of claim 1, wherein the at least one receptacle opening comprises two socket openings, each socket opening being sized and dimensioned to provide access to an electrical socket, and wherein the at least one fastener opening comprises a screw opening configured for receipt of a screw.

12. The cord organizer of claim 1, wherein a tip of the at least one male fastening member is not the rearmost point of the back side of the cord organizer.

13. The cord organizer of claim 1, wherein a surface of the back side of the cover plate is configured to abut a wall, and wherein the at least one male fastening member does not extend beyond a plane defined by that surface.

14. The cord organizer of claim 1, wherein the cover plate is secured to an electrical receptacle.

15. The cord organizer of claim 14, wherein an electrical cord is plugged into an electrical socket of the electrical receptacle, and wherein excess length of the electrical cord is retained by the cord organizer.

16. A method of organizing an electrical cord, comprising:
(a) fastening, to a cover plate having a curved, end portion, a cord retaining member;
(b) securing, in covering relation to an electrical receptacle, the cover plate such that an electrical socket of the electrical receptacle is accessible via a receptacle opening of the cover plate;
(c) inserting an electrical plug into the electrical socket of the electrical receptacle;
(d) gathering an electrical cord extending from the electrical plug;
(e) passing an end of a strap portion of the cord retaining member through a slit defined in the cover plate such that a retaining loop is defined;
(f) disposing a portion of the electrical cord within the retaining loop;
(g) causing a larger extent of the strap portion to pass through the slit such that a circumference of the retaining loop decreases and the retaining loop tightens around the portion of the electrical cord; and
(h) securing the strap portion such that the electrical cord is retained within the retaining loop.

* * * * *